US012046834B2

(12) United States Patent
Chen et al.

(10) Patent No.: US 12,046,834 B2
(45) Date of Patent: Jul. 23, 2024

(54) ANTENNA FOR USE IN A DISTRIBUTED ANTENNA SYSTEM

(71) Applicant: Norsat International Inc., Richmond (CA)

(72) Inventors: Yee Chen, Aurora (CA); Tong Li, Aurora (CA); Yazi Cao, Aurora (CA)

(73) Assignee: Norsat International Inc., Richmond (CA)

( * ) Notice: Subject to any disclaimer, the term of this patent is extended or adjusted under 35 U.S.C. 154(b) by 181 days.

(21) Appl. No.: 17/334,481

(22) Filed: May 28, 2021

(65) Prior Publication Data

US 2022/0311139 A1 Sep. 29, 2022

(51) Int. Cl.
*H01Q 5/335* (2015.01)
*H01Q 1/00* (2006.01)
*H01Q 5/20* (2015.01)

(52) U.S. Cl.
CPC ............. *H01Q 5/335* (2015.01); *H01Q 1/002* (2013.01); *H01Q 5/20* (2015.01)

(58) Field of Classification Search
CPC ........... H01Q 5/335; H01Q 1/002; H01Q 5/20
See application file for complete search history.

(56) References Cited

U.S. PATENT DOCUMENTS 5,828,339 A * 10/1998 Patel ...................... H01Q 1/246 343/789
7,202,829 B2 4/2007 Lan
7,898,369 B2 3/2011 Kaegebein
8,154,363 B2 4/2012 Kaegebein
8,884,832 B2 11/2014 Huang
9,590,308 B2 3/2017 Leppaluoto
9,601,857 B2 3/2017 Gutierrez et al.
9,646,755 B2 5/2017 Lint
9,664,711 B2 5/2017 Lint et al.
9,716,344 B2 7/2017 Zhou et al.
9,728,846 B2 8/2017 Emerick et al.
9,780,438 B2 10/2017 Kuehler et al.
9,823,274 B2 11/2017 Lint et al.
10,048,293 B2 8/2018 Lint et al.
(Continued)

FOREIGN PATENT DOCUMENTS

KR 101275219 B1 6/2013

*Primary Examiner* — Hoang V Nguyen
*Assistant Examiner* — Yonchan J Kim
(74) *Attorney, Agent, or Firm* — Nexus Law Group LLP; Nicholas P. Toth

(57) ABSTRACT

An antenna for use in a distributed antenna system includes: (a) a feeding circuit on a first side of a first dielectric defining a planar edge perpendicular to the first side, a coplanar waveguide comprising a signal feed and a signal return coplanar with and interfittingly apart from the signal feed; (b) a radiator circuit on a second side of a second dielectric, a monopole radiator and a radiator return being copolanar and spaced apart from each other, the first dielectric capacitively coupling the signal feed to the monopole radiator; and (c) an edge connection along the planar edge for electrically connecting the signal return to the radiator return. A cover encloses the feeding circuit, including its impedance matching, in a water-resistant enclosure. The antenna ceiling-mounts indoors, is coated with a fire-resistant coating, and is operable at VHF (132-174 MHz), UHF (350-520 MHz), and 698-960 MHz.

16 Claims, 3 Drawing Sheets

(56) References Cited

U.S. PATENT DOCUMENTS

| | | | | |
|---|---|---|---|---|
| 10,079,088 | B2 | 9/2018 | Lint | |
| 10,256,025 | B2 | 4/2019 | Ma et al. | |
| 10,288,668 | B2 | 5/2019 | Roemer et al. | |
| 10,361,022 | B2 | 7/2019 | Lint | |
| 10,490,949 | B2 | 11/2019 | Rascon et al. | |
| 10,645,811 | B2 | 5/2020 | Dinh et al. | |
| 10,679,783 | B2 | 6/2020 | Zhang et al. | |
| 2002/0158809 | A1* | 10/2002 | Onishi | H01Q 1/42 343/872 |
| 2003/0048226 | A1* | 3/2003 | Gothard | H01Q 9/285 343/893 |
| 2004/0189533 | A1* | 9/2004 | Yamanaka | H01Q 9/0457 343/700 MS |
| 2008/0094284 | A1* | 4/2008 | Mei | H01Q 1/24 343/895 |
| 2017/0324156 | A1* | 11/2017 | Pacetti | C09D 123/00 |
| 2018/0287431 | A1* | 10/2018 | Liu | H05K 1/0243 |
| 2019/0386383 | A1* | 12/2019 | Shehan | H01Q 1/52 |
| 2020/0013534 | A1 | 1/2020 | Dinh et al. | |
| 2020/0260585 | A1 | 8/2020 | Dinh et al. | |

* cited by examiner

ANTENNA FOR USE IN A DISTRIBUTED ANTENNA SYSTEM

BACKGROUND OF THE INVENTION

1. Field of Invention

This invention relates to the transmission of electromagnetic radiation and, in particular, to an antenna for use in a distributed antenna system.

2. Description of Related Art

A distributed antenna system (DAS) is a network of spatially separated DAS antennas connected to a common signal-feed source via feed cables. The DAS provides wireless service within specified frequency bands, and the DAS antennas are known to be mounted indoors to a ceiling within a building structure such that the feed cables are hidden from view within the plenum space of the building structure.

A conventional DAS antenna is known to be configured as a wideband monopole antenna having a longitudinal radiating element attached perpendicularly to a planar reflector. The planar reflector is mounted parallel to the ceiling such that the longitudinal radiating element projects downwardly from the ceiling into a room of the building structure. However, such conventional wideband monopole antennas are not low-profile.

U.S. Pat. No. 8,884,832 to Huang et al. discloses an indoor ceiling-mount omnidirectional antenna comprising a monopole having a conical-column structure. However, due to the conical-column structure, the antenna of Huang et al. is not low-profile.

Conventional low-profile DAS antennas employ a printed circuit board (PCB) as the monopole instead of using a longitudinal radiating element. It is known that antenna performance is proportional to antenna volume and that the performance of the conventional low-profile DAS antenna is poor if the length of the monopole is less than one-quarter of the wavelength of the lowest frequency of the frequency band being transmitted. Ceiling tiles of building structures are conventionally sized 2 feet by 2 feet or sized 2 feet by 4 feet with metal frames supporting each ceiling tile at its perimeter. Such ceiling tiles sizes and the use of metal frames in the ceiling limit the length of the PCB that can be used in a conventional low-profile DAS antenna. Accordingly, conventional low-profile DAS antennas are suitable only for frequencies at or above the UHF (Ultra High Frequency) band.

Korean patent No. KR101275219 to Jin Young Park, which is entitled Planar Antenna Assembly Fixed to Ceiling, discloses a planar antenna suitable for being fixed to a ceiling and operable to transmit electromagnetic radiation in a low-band (806 to 960 MHz) and in a high-band (1700 to 2700 MHz). However, the planar antenna of Jin Young Park is not useable at the VHF (Very High Frequency) band that is lower in frequency than the UHF band.

An object of the invention is to address the above shortcomings.

SUMMARY

The above shortcomings may be addressed by providing, in accordance with one aspect of the invention, an antenna for use in a distributed antenna system. The antenna includes: (a) a feeding circuit disposed on a first side of a first dielectric defining an edge perpendicular to the first side, the feeding circuit comprising a coplanar waveguide comprising a signal feed and a signal return coplanar with and interfittedly apart from the signal feed; (b) a radiator circuit disposed on a second side of a second dielectric, the radiator circuit comprising a monopole radiator and a radiator return copolanar with and spaced apart from the monopole radiator, the first dielectric capacitively coupling the signal feed to the monopole radiator; and (c) an edge connection disposed along the edge for electrically connecting the signal return to the radiator return.

The feeding circuit may include an impedance-matching circuit member. The impedance-matching circuit member may include a resistance connected in series with a meandering trace. The meandering trace may define at least one switchback. The meandering trace may define a first end and a second end opposite the first end. The feeding circuit may define a trace-free gap between the signal feed and the first end. The trace-free gap may be dimensioned for receiving a surface-mount resistor. The surface-mount resistor may provide the resistance. The antenna may include a second edge connection on the edge for electrically connecting the meandering trace at its second end to the radiator return. The antenna may include a first single-layer PCB (Printed Circuit Board) and a second single-layer PCB. The first single-layer PCB may include the feeding circuit and the first dielectric. The second single-layer PCB may include the radiator circuit and the second dielectric. The antenna may include a two-layer PCB (Printed Circuit Board) and a single-layer PCB. The two-layer PCB may include the feeding circuit and the first dielectric. The single-layer PCB may include the radiator circuit and the second dielectric. The antenna may include a cover. The cover may be operable to enclose the feeding circuit. The cover may be operable to enclose the feeding circuit in a water-resistant enclosure. The cover may be dimensioned for receiving a cable holder. The cable holder may be operable to receive a feed cable. The feed cable may include a signal conductor and a ground conductor. The cable holder may be dimensioned to receive the feed cable such that the signal conductor is electrically connectable to the signal feed. The cable holder may be dimensioned to receive the feed cable such that the ground connector is electrically connectable to the radiator return. The cover may include a flange for receiving an adhesive operable to create water-resistant adhesion between the cover and one or both of the radiator circuit and the second dielectric. The antenna may be coated with a fire-resistant coating. The antenna may be dimensioned for receiving a plurality of fasteners for mounting the antenna to a building structure while the plurality of fasteners is electrically isolated from the radiator circuit, the feeding circuit, and the edge connection. The plurality of fasteners may include a plurality of spacers for maintaining a separation between the antenna and the building structure. The antenna may be operable to transmit electromagnetic radiation in a plurality of frequency bands within the frequency range of 100 MHz (Mega Hertz) to 1000 MHz. The antenna may have a lowest operating frequency that is no higher than 132 MHz. The antenna may have a lowest operating frequency of 132 MHz. One or more of the feeding circuit, the radiator circuit, and the edge connection may be made of copper. The first dielectric may be circuit-free on a first backside opposite the first side. The second dielectric may be circuit-free on a second backside opposite the second side. The second dielectric may be disposed other than between the feeding circuit and the radiator circuit.

In accordance with another aspect of the invention, there is provided an antenna for use in a distributed antenna system. The antenna includes: (a) radiator means for wirelessly transmitting a signal; (b) feeding means for coupling the signal to the radiator means; and (c) means for electrically connecting the feeding means to the radiator means.

The antenna may include means for conditioning the signal. The antenna may include means for enclosing the feeding means. The antenna may include means for mounting the radiator means.

The foregoing summary is illustrative only and is not intended to be in any way limiting. Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

An antenna for use in a distributed antenna system includes: (a) radiator means for wirelessly transmitting a signal; (b) feeding means for coupling the signal to the radiator means; and (c) means for electrically connecting the feeding means to the radiator means. The antenna may include one or more of means for conditioning the signal, means for enclosing the feeding means, and means for mounting the radiator means.

Figure 1:
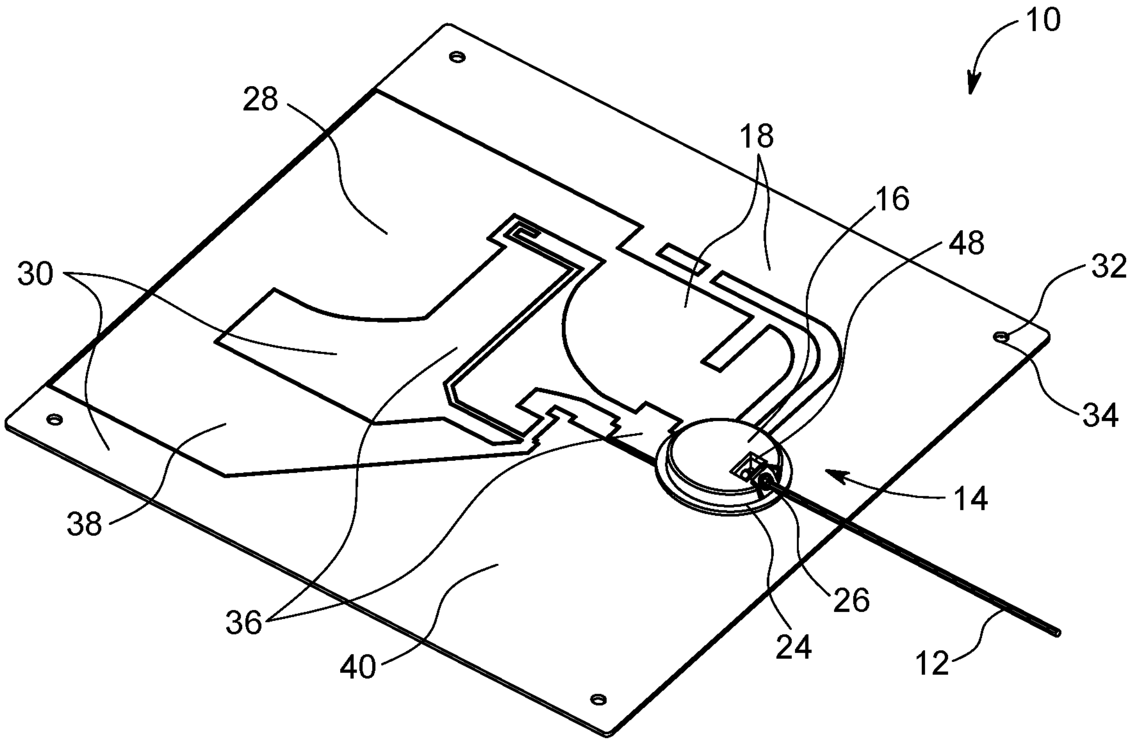
FIG. 1 is a perspective view of an antenna for use in a distributed antenna system, according to a first embodiment of the invention.
Figure 2:
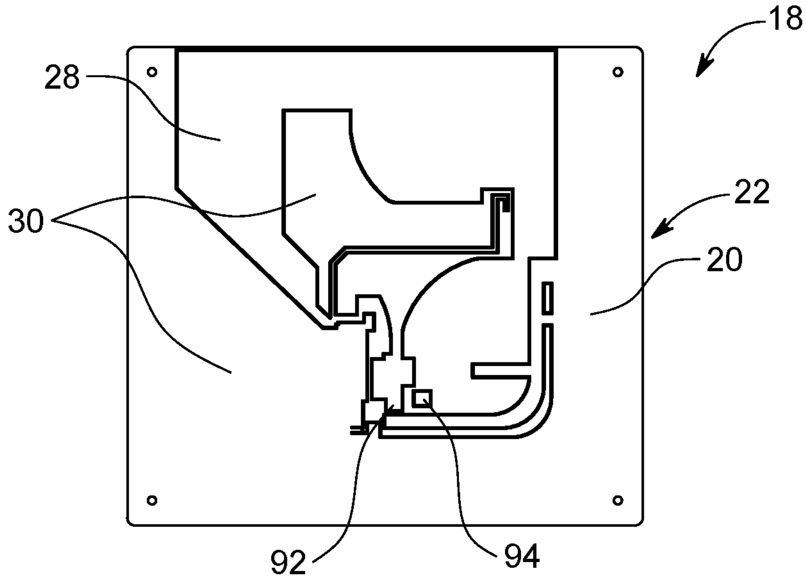
FIG. 2 is a top view of a radiator PCB (Printed Circuit Board) of the antenna shown in FIG. 1, showing a monopole radiator.

Referring to FIGS. 1 and 2, the antenna according to a first embodiment of the invention is shown generally at 10. The antenna 10 is suitable for use in a Distributed Antenna System (DAS), and is operable to transmit electromagnetic radiation in a plurality of frequency bands within the frequency range of 100 MHz (Mega Hertz) to 1000 MHz. In particular, in the first embodiment the frequency bands of interest are the VHF (Very High Frequency) band, including at the low frequency of 132 MHz, and the UHF (Ultra High Frequency) band, with the UHF band including a UHF sub-band and a 700/800 sub-band.

The antenna 10 is operable to receive a feed cable 12 into an enclosure 14 (FIG. 1) formed in the first embodiment by a cover 16 attached to a printed circuit board (PCB) 18 on its top side 20. While not directly visible in FIGS. 1 and 2, in the first embodiment there is a backside 22 opposite to the top side 20. The top side 20 and the backside 22 are parallel to each other and define a PCB 18 plane therebetween.

Referring particularly to FIG. 1, the cover 16 is typically made out of plastic or similar and includes a flange 24 for receiving an adhesive (not shown) or other attachment means such as fasteners or threaded coupling, for example. In the first embodiment, the adhesive is a double-sided adhesive tape (not shown) that provides a water-resistant seal between the cover 16 and the PCB 18. A cable holder, such as the rubber grommet 26 shown in FIG. 1, is operable to receive and hold the feed cable 12. The enclosure 14 in the first embodiment is water-resistant, however, in some embodiments the enclosure 14 is waterproof.

Referring to FIGS. 1 and 2, the PCB 18 includes a dielectric material 28 that is electrically insulating and also includes an electrically conductive material 30 that in the first embodiment is made of copper that is printed on the PCB 18 according to known procedures for creating printed circuits on a printed circuit board. The PCB 18 includes mounting holes 32 extending through the PCB 18 in a direction perpendicular to the PCB 18 plane. On the PCB 18 surrounding each mounting hole 32 is an annular area 34 in which the conductive material 30 has been removed to reveal the non-conductive dielectric material 28.

A radiator circuit of the first embodiment includes a monopole radiator, such as the radiator track 36 shown in FIGS. 1 and 2, that is separated by a separation area 38 from a radiator return, such as the radiator-return track 40 shown in FIGS. 1 and 2. The radiator track 36 and the radiator-return track 40 are coplanar on the top side 20 of the PCB 18 (hereinafter referred to as the "radiator PCB 18"). While not directly visible in FIGS. 1 and 2, in the first embodiment there is no conductive material 30 on the backside 22 of the radiator PCB 18 such that the backside 22 of the radiator PCB 18 is circuit-free.

Figure 3:
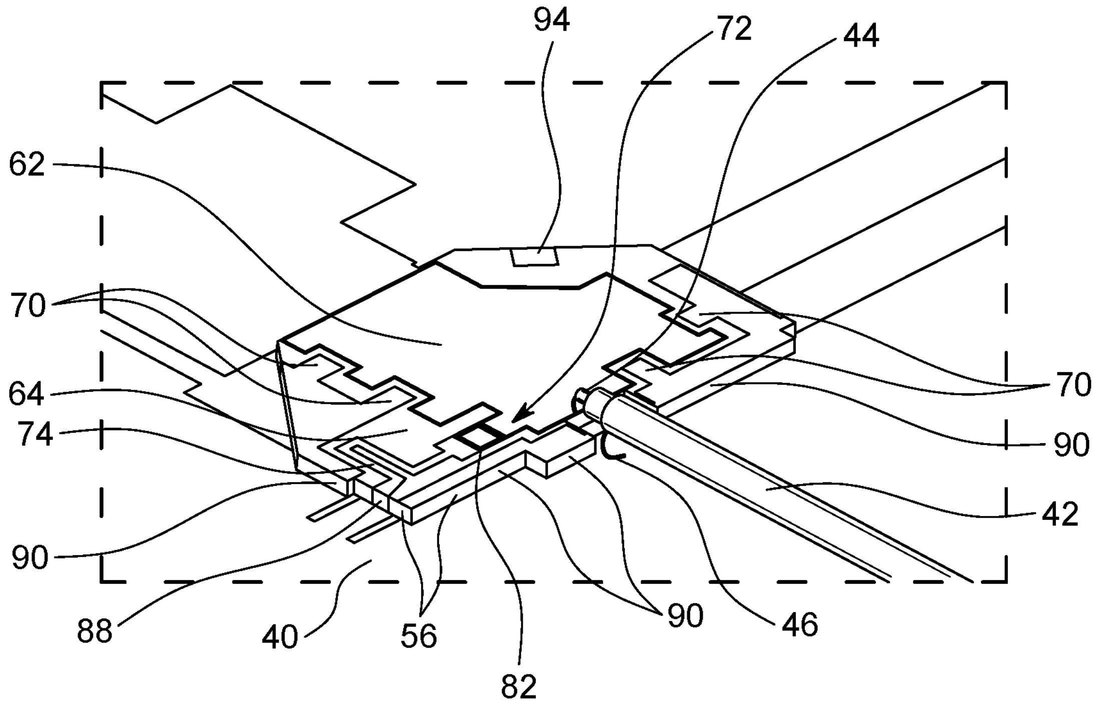
FIG. 3 is a perspective close-up view of a portion of the antenna shown in FIG. 1, showing a feed cable attached to a feed-signal PCB and to the radiator PCB.

In the exemplary embodiment of FIGS. 1 and 3, the feed cable 12 is a coaxial cable having exposed at its terminal end 42 a signal conductor, such as the inner conductor 44 shown in FIG. 3, and a ground conductor, such as the braided shield 46 shown in FIG. 3. As shown in FIG. 1, the cover 16 in the first embodiment includes a walled cutaway 48 dimensioned to provide access to the terminal end 42 for attachment of the inner conductor 44 and the braided shield 46. Adhesive (not shown) may be employed at the base of each wall of the walled cutaway 48 in order to maintain the water-resistance of the cover 16.

Referring to FIG. 3, the inner conductor 44 is electrically connected to a feed-signal PCB 50 and the braided shield 46 is electrically connected to the radiator PCB 18 (a portion of which is shown in FIG. 3). In the first embodiment, the feed-signal PCB 50 is disposed beneath the cover 16 (not shown in FIG. 3) of the antenna 10 for feeding the signal received from the feed cable 12 to the radiator PCB 18.

Figure 4:
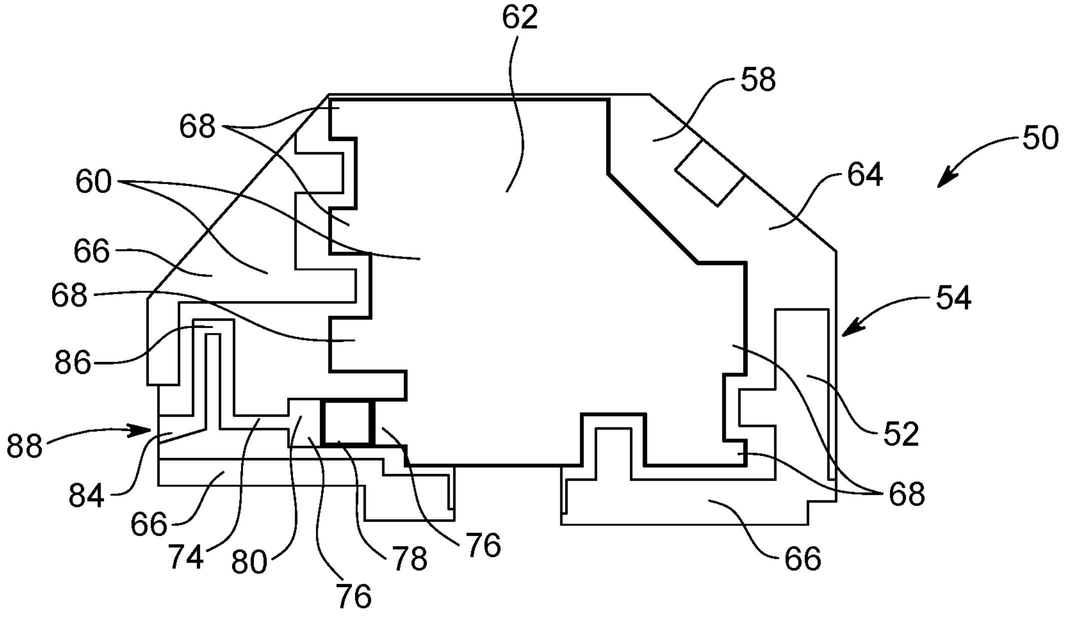
FIG. 4 is a top view of the feed-signal PCB shown in FIG. 3, showing a signal-feed track absent the feed cable.

Referring to FIGS. 3 and 4, the feed-signal PCB 50 includes a top side 52, a backside 54 (not directly visible in FIGS. 3 and 4) that is parallel and spaced apart from the top side 52 so as to define a feed-signal PCB 50 plane therebetween, and includes an edge 56 defined around the perimeter of the insulating dielectric material 58 of the feed-signal PCB 50. The edge 56 is shown in FIG. 3 as a planar edge 56 that is perpendicular to the top side 52 and is perpendicular to the backside 54.

A feeding circuit is defined by electrically conductive material 60 that in the first embodiment is made of copper printed on the feed-signal PCB 50 so as to include a coplanar waveguide implemented by a signal feed, such as the signal-feed track 62 shown in FIGS. 3 and 4, that is separated from a signal return, such as the plurality of signal-return tracks 66 shown in FIGS. 3 and 4, by a dielectric area 64 that is non-conductive. In the first embodiment, the plurality of signal-return tracks 66 effectively surround the signal-feed track 62 while being separated from the signal-feed track 62 by the dielectric area 64. The signal-feed track 62 and the signal-return tracks 66 are coplanar to and spaced apart from each other on the top side 52 of the feed-signal PCB 50.

The signal-feed track 62 includes a plurality of signal-feed projections 68 that interfit with, while remaining spaced apart from, a corresponding plurality of signal-return projections 70 of the plurality of signal-return tracks 66. Such interfitting projections 68 and 70 advantageously provide impedance matching in the UHF band, including its UHF sub-bands.

The conductive material 60 also defines an impedance-matching circuit 70 in shunt mode that is particularly effective for the VHF band. The impedance-matching circuit 72 includes a meandering trace 74 and a pair of SMT (surface mount) resistor pads 76 for receiving a SMT resistor 78 that provides a resistance connected in series with the meandering trace 74. At a proximal end 80 of the meandering trace 74 is one pad 76 for receiving one end of the SMT resistor 78. The other pad 76 is at the signal-feed track 62 on the other side of a trace-free gap 82 defined between the pads 76. The distal end 84 of the meandering trace 74, opposite the proximal end 80, is at the edge 56 of the feed-signal PCB 50. Between the proximal and distal ends 80 and 84 of the meandering trace 74 is at least one switchback 86 that completes at least one turn of 180 degree.

As best seen in FIG. 3, along the edge 56 at the distal end 84 of the meandering trace 74 is an electrically conductive edge connection 88 for electrically connecting the meandering trace 74 to the radiator-return track 40 of the radiator PCB 18. Along the edge 56, the edge connection 88 lies between non-conductive dielectric material 58 portions. Such edge-plating of the edge connection 88 places the impedance-matching circuit 72 in shunt mode relative to the signal-feed track 62.

Also shown in FIG. 3 are ground-return edge connections 90 along the edge 56 that connect the plurality of signal-return tracks 66 to the radiator-return track 40 and to electrical ground provided by its connection to the braided shield 46.

In the first embodiment, the edge connection 88 and the ground-return edge connections 90 are made of copper by edge plating (or sideplating) and are electrically connected to the radiator-return track 40 by soldering, welding, or similar.

Still referring to FIG. 3, the inner conductor 44 of the first embodiment is electrically connected to the signal-feed track 62 of the feed-signal PCB 50 and the braided shield 46 is electrically connected to the radiator-return track 40 of the radiator PCB 18. While not directly visible in FIGS. 3 and 4, in the first embodiment there is no conductive material 60 on the backside 54 of the feed-signal PCB 50 such that the backside 54 of the feed-signal PCB 50 is circuit-free.

With reference to FIGS. 2 and 3, when the feed-signal PCB 50 is placed adjacently parallel to the radiator PCB 18, the electromagnetic signal received from the inner conductor 44 onto the signal-feed track 62 is thereafter capacitively coupled via the dielectric material 58 to the radiator track 36, including especially to a portion 92 (FIG. 2) of the radiator track 36 adjacent to the signal-feed track 62. In the first embodiment, the electromagnetic signal at the signal-feed track 62 is suitably impedance matched by the impedance matching circuit 72 and the plurality of interfitting projections 68 and 70 for capacitive coupling to the radiator track 36.

Referring to FIGS. 2 to 4, the antenna 10 also includes a pair of conductive islands 94 on the feed-signal PCB 50, including at its edge 56, and on the radiator PCB 18, respectively. The islands 94 provide additional mechanical stability when connected to each other, such as by soldering, welding, or similar, and do so advantageously without degrading the electromagnetic performance of the antenna 10.

Figure 5:
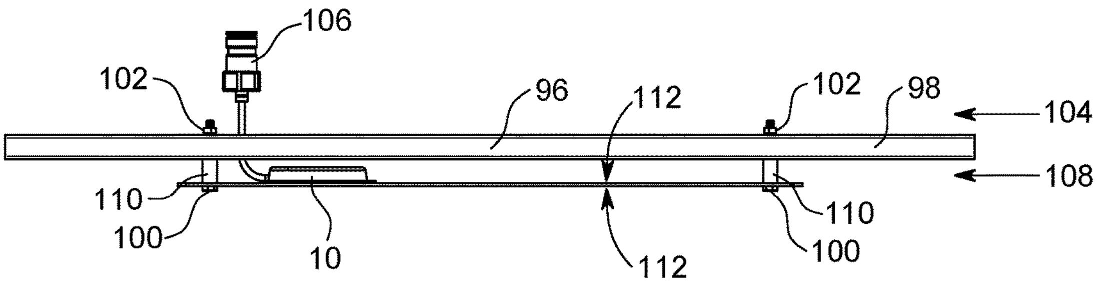
FIG. 5 is an elevation side view of the antenna shown in FIG. 1, showing the antenna mounted to a ceiling of a building structure.

Referring to FIG. 5, the antenna 10 is suitable for being mounted indoors at a ceiling 96 of a building structure 98. The mounting holes 32 (FIGS. 1 and 2) of the radiator PCB 18 are dimensioned to receive fasteners, such as the bolts 100 shown in FIG. 5. In the exemplary mounting configuration of FIG. 5, the bolts 100 pass through the radiator PCB 18 at the mounting holes 32 and pass through the ceiling 96 to corresponding nuts 102 fastened to the bolts 100 above the ceiling 96. The feed cable 12 also passes through an aperture in the ceiling 96 into a plenum space 104 of the building structure 98 above the ceiling 96. Typically, the feed cable 12 includes a connector 106 to connect to a common signal-feed source (not shown) of a distributed antenna system.

In the exemplary mounting configuration of FIG. 5, the antenna 10, including its cover 16, is entirely beneath the ceiling 96 and a separation 108 between the antenna 10 and the building structure, including its ceiling 96, is maintained by spacers 110 coupled to the bolts 100. In some embodiments (not shown), however, the spacers 110 are excluded and the radiator PCB 18 is mounted with its top side 20 flush against or otherwise adjacently in contact with the ceiling 96. In embodiments not employing the spacers 110, an additional or larger recess or aperture in the ceiling 96 is required to permit the cover 16 to protrude into the ceiling 96 or through the ceiling 96 into the plenum space 104.

While not directly visible in FIG. 5, the antenna 10 in the first embodiment is painted or otherwise coated with a fire-resistant coating 112. In the first embodiment, the cover 16 prevents the fire-resistant coating 112 from ingressing into the interior of the enclosure 14 (FIG. 1) when the fire-resistant coating 112 is applied.

As can be readily seen in FIG. 5, the antenna 10 of the first embodiment is a low-profile, planar antenna 10 having a minimal vertical height. The circuit-free backside 22 of the radiator PCB 18 and the fire-resistant coating 112 of a selected colour, such as white or off-white, and selected sheen, such as a matte finish, advantageously provide an unobtrusive appearance to the mounted antenna 10 that is aesthetically pleasing.

Figure 6:
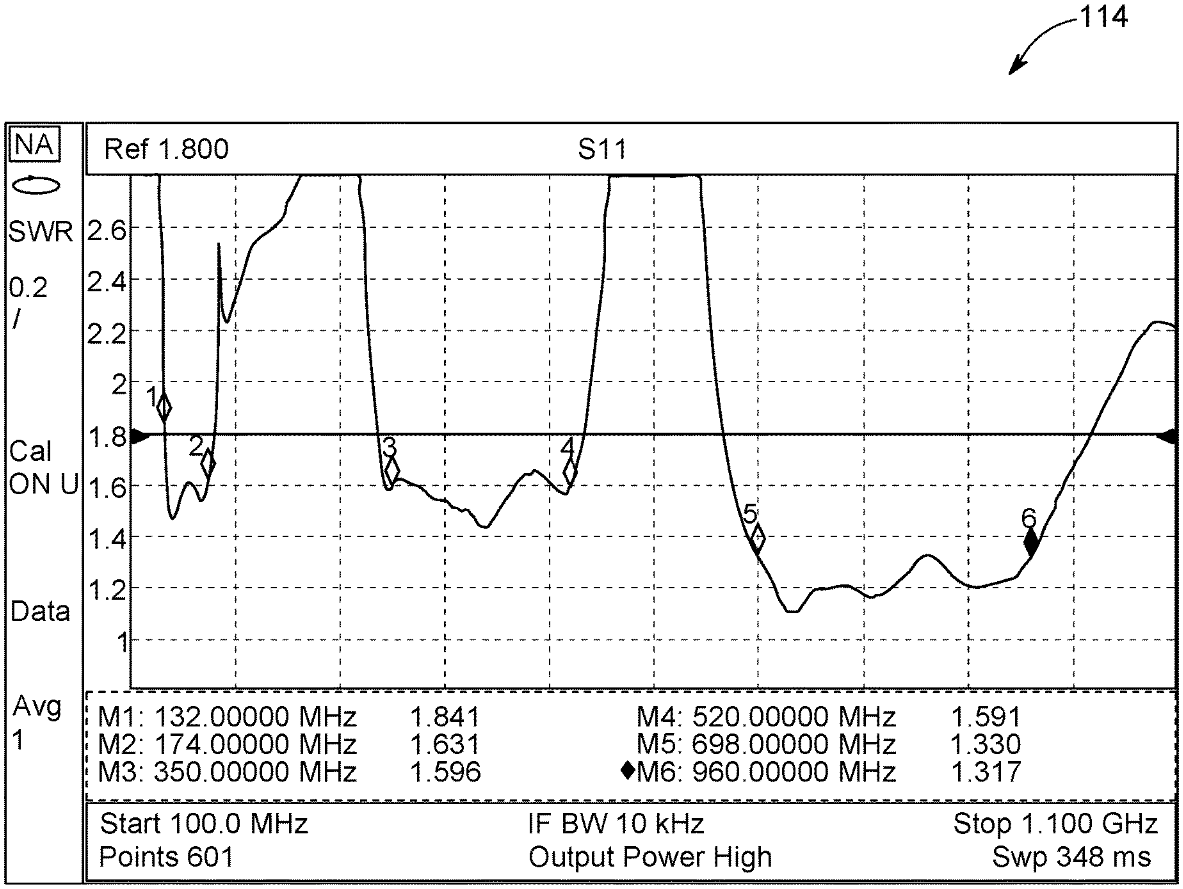
FIG. 6 is a graph of VSWR (Voltage Standing Wave Ratio) vs. frequency measurements for the antenna shown in FIG. 1, showing operational suitability of the antenna at multiple frequency bands, including operational suitability at the low frequency of 132 MHz.

Referring to FIG. 6, the antenna 10 is particularly suitable for transmitting electromagnetic radiation in multiple frequency bands, including in the frequency range of 132 MHz to 174 MHz of the VHF band, in the frequency range of 350 MHz to 520 MHz of the UHF band, and in the frequency range of 698 MHz to 960 MHz (which can be referred to as the “700/800 band”). As can be seen in the graph 114 shown in FIG. 6, the voltage standing wave ratio (VSWR) of the antenna 10, measured in a free-space environment, is less than 2.0 at frequencies within the multiple frequency bands, including at the low frequency of 132 MHz.

In the first embodiment, no more than four bolts 100 are needed to mount the antenna 10 to the ceiling 96, thereby minimizing the generation of passive intermodulation (PIM) that could degrade antenna 10 performance. Also, the radiator PCB 18, feed-signal PCB 50, feed cable 12, and connector 106 have low-PIM performance ratings in the first embodiment. Accordingly, the antenna 10 according to the first embodiment is a low-PIM antenna 10.

Method of Assembly

Referring to FIGS. 1 to 4, the antenna 10 in the first embodiment can be assembled by an exemplary method of assembly in which a first step is to attach, such as by soldering, the SMT resistor 78 onto the resistor pads 76. Typically, the resistance value of the SMT resistor 78 is selected for optimal antenna 10 performance.

Before or after the SMT resistor 78 is attached, the feed-signal PCB 50 is attached to the radiator PCB 18. Attaching the feed-signal PCB 50 to the radiator PCB 18 typically involves aligning the feed-signal PCB 50 according to silkscreened indicators on the radiator PCB 18; alignedly positioning the feed-signal PCB 50 against the radiator PCB 18; attaching, such as by soldering or welding, the conductive islands 94 to each other via a connecting trace at the edge 56; and connecting, such as by soldering or welding, the feed-signal PCB 50 at its edge connection 88 and ground-return edge connections 90 to the radiator-return track 40 of the radiator PCB 18.

Before or after the feed-signal PCB 50 is attached to the radiator PCB 18, the cover 16 at its grommet 26 is placed over the unconnectorized terminal end 42 of the feed cable 12; the terminal end 42 of the feed cable 12 is positioned proximate to the feed-signal PCB 50; the braided shield 46 is electrically connected, such as by soldering or welding, to the radiator-return track 40; the inner conductor 44 is electrically connected, such as by soldering or welding, to the signal-feed track 62; an adhesive, such as a double-sided adhesive tape (not shown), is applied to the flange 24 of the cover 16; and the cover 16 at its grommet 26 is slid along the feed cable 12 until the cover 16 is positioned over the feed-signal PCB 50 and against the radiator PCB 18. Upon curing of the adhesive, the antenna 10 can be used, including being mounted for use.

Thus, there is provided an antenna for use in a distributed antenna system, the antenna comprising: (a) a feeding circuit disposed on a first side of a first dielectric defining an edge perpendicular to the first side, the feeding circuit comprising a coplanar waveguide comprising a signal feed and a signal return coplanar with and interfittedly apart from the signal feed; (b) a radiator circuit disposed on a second side of a second dielectric, the radiator circuit comprising a monopole radiator and a radiator return copolanar with and spaced apart from the monopole radiator, the first dielectric capacitively coupling the signal feed to the monopole radiator; and (c) an edge connection disposed along the edge for electrically connecting the signal return to the radiator return.

While embodiments of the invention have been described and illustrated, such embodiments should be considered illustrative of the invention only. Thus, the embodiments described and illustrated herein should not be considered to limit the invention as construed in accordance with the accompanying claims.

What is claimed is:

1. An antenna for use in a distributed antenna system, the antenna comprising:

(a) a feeding circuit disposed on a first side of a first dielectric defining a planar edge perpendicular to the first side, the feeding circuit comprising a coplanar waveguide comprising a signal feed and a signal return coplanar with and interfittingly apart from the signal feed;

(b) a radiator circuit disposed on a second side of a second dielectric, the radiator circuit comprising a monopole radiator and a radiator return coplanar with and spaced apart from the monopole radiator, the first dielectric capacitively coupling the signal feed to the monopole radiator; and (c) an edge connection disposed along the planar edge for electrically connecting the signal return to the radiator return.

2. The antenna of claim 1 wherein the feeding circuit comprises an impedance-matching circuit member.

3. The antenna of claim 2 wherein the impedance-matching circuit member comprises a resistance connected in series with a meandering trace defining at least one switchback.

4. The antenna of claim 3 wherein the meandering trace defines a first end and a second end opposite the first end, the feeding circuit defining a trace-free gap between the signal feed and the first end, the trace-free gap being dimensioned for receiving a surface-mount resistor for providing the resistance.

5. The antenna of claim 4 comprising a second edge connection on the planar edge for electrically connecting the meandering trace at the second end to the radiator return.

6. The antenna of claim 1 comprising a first single-layer PCB (Printed Circuit Board) and a second single-layer PCB, the first single-layer PCB comprising the feeding circuit and the first dielectric, the second single-layer PCB comprising the radiator circuit and the second dielectric.

7. The antenna of claim 1 comprising a two-layer PCB (Printed Circuit Board) and a single-layer PCB, the two-layer PCB comprising the feeding circuit and the first dielectric, the single-layer PCB comprising the radiator circuit and the second dielectric.

8. The antenna of claim 1 further comprising a cover operable to enclose the feeding circuit in a water-resistant enclosure.

9. The antenna of claim 8 wherein the cover is dimensioned for receiving a cable holder operable to receive a feed cable comprising a signal conductor and a ground conductor, the cable holder being dimensioned to receive the feed cable such that the signal conductor is electrically connectable to the signal feed and the ground connector is electrically connectable to the radiator return.

10. The antenna of claim 8 wherein the cover comprises a flange for receiving an adhesive operable to create water-resistant adhesion between the cover and one or both of the radiator circuit and the second dielectric.

11. The antenna of claim 1 wherein the antenna is coated with a fire-resistant coating.

12. The antenna of claim 1 wherein the antenna is dimensioned for receiving a plurality of fasteners for mounting the antenna to a building structure while the plurality of fasteners is electrically isolated from the radiator circuit, the feeding circuit, and the edge connection.

13. The antenna of claim 12 wherein the plurality of fasteners comprises a plurality of spacers for maintaining a separation between the antenna and the building structure.

14. The antenna of claim 1 wherein the antenna is operable to transmit electromagnetic radiation in a plurality of frequency bands within a frequency range of 100 MHz (Mega Hertz) to 1000 MHz.

15. The antenna of claim 1 wherein one or more of the feeding circuit, the radiator circuit, and the edge connection are made of copper.

16. The antenna of claim 1 wherein the first dielectric is circuit-free on a first backside opposite the first side and the second dielectric is circuit-free on a second backside opposite the second side, the second dielectric being disposed other than between the feeding circuit and the radiator circuit.

* * * * *